United States Patent [19]

Rauckhorst, III et al.

[11] Patent Number: 5,427,332
[45] Date of Patent: Jun. 27, 1995

[54] MODULAR ICE PROTECTION ASSEMBLY

[75] Inventors: Richard L. Rauckhorst, III, North Canton; Kevin L. Leffel, Akron, both of Ohio

[73] Assignee: The B. F. Goodrich Company, Akron, Ohio

[21] Appl. No.: 149,875

[22] Filed: Nov. 10, 1993

[51] Int. Cl.[6] .................... B64C 1/34; B64D 15/18
[52] U.S. Cl. .................... 244/134 A; 244/134 D
[58] Field of Search ............ 244/134 R, 134 A, 134 D

[56] References Cited

U.S. PATENT DOCUMENTS

| | | | |
|---|---|---|---|
| 1,942,867 | 1/1934 | Leguillon | 244/134 A |
| 2,297,951 | 10/1942 | Frank | 244/134 A |
| 2,343,986 | 3/1944 | Leutholt | 244/134 A |
| 2,378,528 | 6/1945 | Arsandaux | 244/134 A |
| 2,391,241 | 12/1945 | Hunter | 244/134 A |
| 2,393,635 | 1/1946 | Hubbard | 244/134 D |
| 2,851,229 | 9/1958 | Clark | 244/134 A |
| 4,706,911 | 11/1987 | Briscoe et al. | 244/134 A |
| 4,826,108 | 5/1989 | Briscoe et al. | 244/134 A |
| 4,875,644 | 10/1989 | Adams et al. | 244/134 R |
| 5,098,037 | 3/1992 | Leffel et al. | 244/134 A |
| 5,248,116 | 9/1993 | Rauckhorst | 244/134 A |
| 5,288,355 | 2/1994 | Leffel et al. | 244/134 A X |
| 5,337,978 | 8/1994 | Fahrner et al. | 244/134 A |
| 5,356,096 | 10/1994 | Rauckhorst, III et al. | 244/134 A |

FOREIGN PATENT DOCUMENTS 842256  6/1939  France ............................ 244/134 A

*Primary Examiner*—William Grant
*Attorney, Agent, or Firm*—Richard A. Romanchik

[57] ABSTRACT

A modular ice protection system for an airfoil includes a deflection assembly attached to the airfoil and a removable outer shell having a modulus of elasticity of at least 40,000 kPa impermanently disposed over the deflection assembly, wherein the deflection assembly causes distortion of the separable outer shell during de-icing. The deflection assembly may likewise be removable from an underlying substructure which is attached to the airfoil.

35 Claims, 6 Drawing Sheets

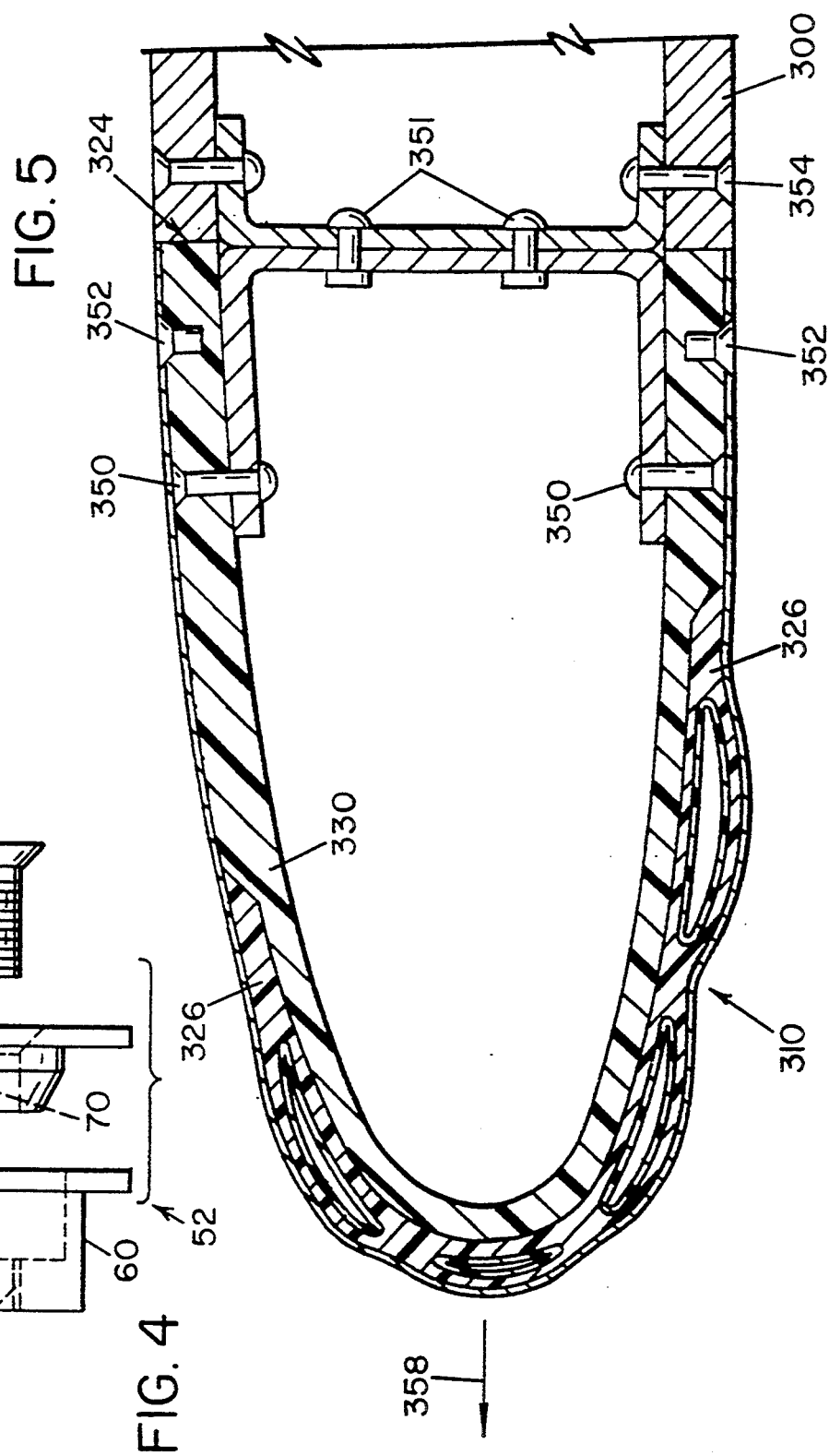

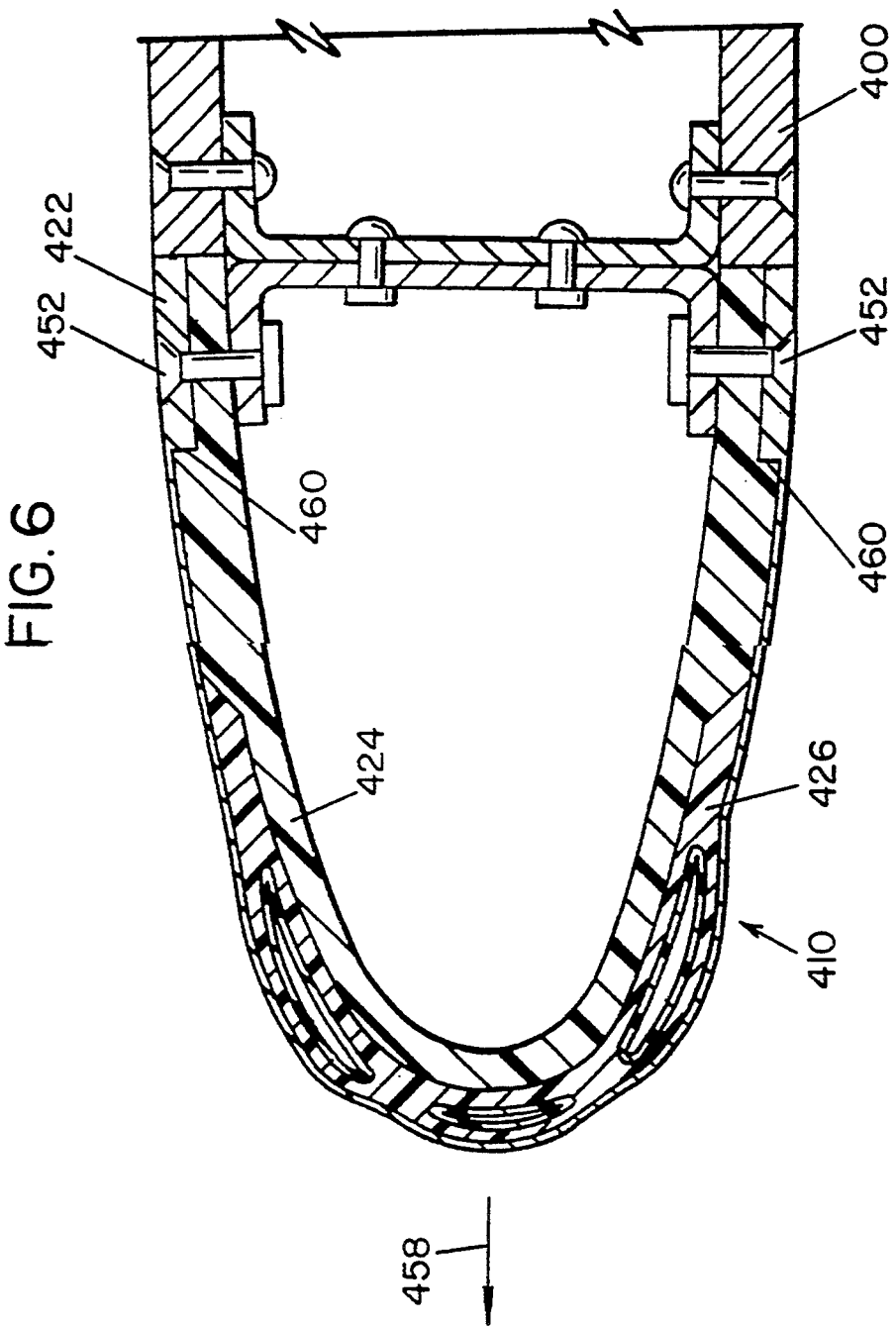

MODULAR ICE PROTECTION ASSEMBLY

FIELD OF THE INVENTION

This invention relates to de-icing apparatus, and more particularly, a modular de-icing apparatus for installation on an airfoil or leading edge which includes a removable outer high modulus skin disposed over an underlying skin deflection means.

BACKGROUND OF THE INVENTION

From the beginning of powered aviation, aircraft have been under certain flying conditions troubled by accumulations of ice on component surfaces of aircraft such as wings and struts. If unchecked, such accumulations can eventually so laden the aircraft with additional weight and so alter the airfoil configuration of the wings and control surfaces of that aircraft so as to precipitate an unflyable condition. Efforts to prevent and/or remove such accumulations of ice under flying conditions has resulted in three generally universal approaches to removal of accumulated ice, a process known generally as de-icing.

In one form of de-icing, known as thermal deicing, leading edges are heated to loosen adhesive forces between accumulating ice and the aircraft component. Once loosened, this ice is generally blown from the aircraft component by the airstream passing over the aircraft. There are two popular methods of heating leading edges. In one approach known as electrothermal deicing, an electrical heating element is placed in the leading edge zone of the aircraft component, either by inclusion in a elastomeric boot applied over the leading edge, or by incorporation into the skin structure of the aircraft component. This heating element is typically powered by electrical energy derived from a generating source driven by one or more of the aircraft engines and is switched on and off to provide heat sufficient to loosen accumulating ice. In small aircraft, a sufficient quantity of electrical power may be unavailable for use of electrothermal de-icing.

In the other heating approach, gases at elevated temperature from one or more compression stages of a turbine engine are circulated through the leading edges of components such as wings and struts in order to affect a de-icing or anti-icing effect. This approach is employed typically only in aircraft powered by turbine engines by draining off compressed air having an elevated temperature from one or more compressor stations of a turbine engine. This approach can result in reduced fuel economy and lower turbine power output.

Another method for de-icing involves chemicals. In limited situations, a chemical has been applied to all or part of an aircraft to depress adhesion forces associated with ice accumulation upon the aircraft or to depress the freezing point of water collecting upon surfaces of the aircraft.

The remaining commonly employed method for deicing is typically termed mechanical de-icing. In the principal commercial mechanical de-icing means, pneumatic de-icing, the leading edge zone or wing or strut component of an aircraft is covered with a plurality of expandable, generally tube-like structures, inflatable employing a pressurized fluid, typically air. Upon inflation, the tubular structures tend to expand substantially the leading edge profile of the wing or strut and crack ice accumulating thereon for dispersal into the airstream passing over the aircraft component. Typically, these tube-like structures have been configured to extend substantially parallel to the leading edge of the aircraft. These conventional low pressure pneumatic de-icers are formed from compounds having rubbery or substantially elastic properties. Typically, the material forming the inflatable tubes on such de-icer structures can expand or stretch by 40% or more during an inflatable cycle, thereby causing a substantial change in the profile the de-icer as well as the leading edge to thereby crack ice accumulating on the leading edge.

Other mechanical means for effecting ice de-icing include electromechanical hammering such as that described in U.S. Pat. No. 3,549,964 to Levin et al., although concern respecting the susceptibility of the airfoil skin to stress fatigue upon being hammered over extended periods of time have functioned in part to preclude substantial commercial development or adoption of such technique.

Another electromechanical ice removal system is described in U.S. Pat. No. 4,690,353 to Haslim et wherein one or more overlapped flexible ribbon conductors, each of which is folded back on itself, is embedded in an elastomeric material. When a large current pulse is fed to the conductor, the anti-parallel currents in the opposed segments of adjacent layers of the conductor result in interacting magnetic fields producing an electrorepulsive force between the overlapping conductor segments causing them to be separated near instantaneously. This distention tends to remove any solid body on the surface of the elastomeric material.

Another electromechanical ice removal system is described in U.S. Pat. No. 5,129,598 to Adams et al., the teachings of which are herein incorporated by reference. Two or more sheet-like arrays, each containing in spaced apart relationship a plurality of parallel ribbon-shaped electrical conductive members, are rapidly and forcefully driven apart when a large magnitude current pulse is fed to the conductors.

U.S. Pat. No. 4,706,911 to Briscoe et al. and U.S. Pat. No. 4,747,575 to Putt et al. disclose apparatus for de-icing leading edges in which an impulse of fluid under pressure is utilized to rapidly inflate an inflation tube positioned between a support surface and a sheet-like skin possessed of a substantially elevated modulus. The impulse of fluid is delivered to the inflation tube causing the high modulus skin to dislocate and then stop suddenly. Momentum imparted to the ice accumulations thereby causes additional ice movement which assists in ice detachment and dislodgement. The inflatable tubular structure in certain preferred embodiments is inflated within not more than about 0.5 milliseconds. FIG. 4 and the attendant description of U.S. Pat. No. 4,706,911 describe an ejector/pilot operated discharge valve suitable for use in such pneumatic impulse de-icers. In FIG. 7 and the attendant description of U.S. Pat. No. 4,747,575 there is described a chattering valve for use in a pneumatic impulse de-icer which delivers a rapid series of fluid pressure pulses to the inflatable tube of a de-icer apparatus affixed to a leading edge. Efforts to improve such pneumatic impulse de-icing systems have led to continuing efforts to improve valves for delivery of the desired fluid impulse.

Commonly owned U.S. Pat. No. 5,098,037 to Leffel et al. discloses a structural airfoil having an integral expulsive system, wherein the type of expulsive system utilized is variable. The teachings of Leffel et al. are also incorporated herein by reference.

While the devices and methods disclosed in the foregoing patents have been found to be suitable for deicing aircraft, it remains a desired goal of the industry to reduce weight and increase service life and reliability wherever possible. Toward these objectives modern aircraft designers and manufactures are specifying with increasing frequency use of lightweight composite materials manufactured from high modulus fibers including, but not limited to, carbon, graphite, aramid, and glass in matrices of organic resins or carbon. Leading edge surfaces such as those found on wings and struts of aircraft and tail sections have been provided with separately manufactured apparatus such as that disclosed in U.S. Pat. Nos. 4,706,911 and 4,747,575. Such apparatus have been fitted to existing wing structures by adhesive bonding of such auxiliary deicing apparatus. Such auxiliary devices change the contour of the leading edge by virtue of their presence, an undesired consequence. As an alternative, at the time of design or prior to fitting of such an apparatus, the leading edge of the airfoil of certain prior art embodiments has been modified so as to provide a recess for fitting of the deicing apparatus. This latter manner of providing deicing apparatus results in a finished assembly having smooth airflow characteristics due to the provision of such recess. Many of the heretofore known accessory deicing apparatuses were provided with an outer ice accreting surface formed of elastomeric material such as rubber (neoprene) or urethane. These materials are far more susceptible to erosion from the action of rain, sleet, hail, and snow during flight than the conventional aluminum alloy leading edge surface employed on modern large commercial and certain general aviation and commuter aircraft. Such aircraft have a service life expectancy of twenty or more years, including the aluminum alloy skin which is typically from about 0.025 inch to about 0.190 inch thick.

Rain is not the only type of impact that leading edges encounter. Impacts by birds, hail and debris kicked up from the runway and accidents during routine aircraft maintenance are also likely during the operational life of the aircraft.

It is an objective of the aircraft industry to minimize repair or replacement costs of such deicing apparatus. Efforts to improve such systems have led to continuing developments to improve their versatility, practicality and efficiency.

SUMMARY OF THE INVENTION

According to an aspect of the present invention, there is provided a de-icing apparatus for an airfoil comprising:
 deflection means;
 a separable outer shell impermanently disposed over said deflection means; and,
 wherein said deflection means causes distortion of said separable outer shell.

According to another aspect of the invention, there is provided a method of de-icing an airfoil comprising the steps of:
 (a) attaching a deflection means to the airfoil utilizing first attachment means;
 (b) impermanently covering said deflection means with a separable outer shell utilizing second separable attachment means; and,
 (c) energizing said deflection means to thereby cause distortion of said separable outer shell.

These and other objects, features and advantages of the present invention will become more apparent in the light of the detailed description of exemplary embodiments thereof, as illustrated by the drawings.

BRIEF DESCRIPTION OF THE DRAWINGS

FIG. 4 is a side view of the connector for securing the skin of the apparatus of FIG. 1 to the airfoil.

FIG. 5 is a fragmentary sectional view of an airfoil having an apparatus according to a second alternative embodiment of the present invention defining the leading edge portion thereof, depicted in the energized state.

FIG. 6 is a fragmentary sectional view of an airfoil having an apparatus according to a third alternative embodiment of the present invention defining the leading edge portion thereof, depicted in the energized state.

BEST MODE FOR CARRYING OUT THE INVENTION

The present invention provides an apparatus in the form of a structural member having integral surface separation capability which is capable of deicing a leading edge. The present invention also provides a method of manufacture of such apparatus and a method for deicing employing such apparatus. Deicing is removal of ice subsequent to its formation upon a leading edge. A "leading edge" is that portion of a surface of a structure which functions to meet and break an airstream impinging upon the surface of the structure. Examples of leading edges are respective forward portions of wings, stabilizers, struts, nacelles, and other housings and protrusions first impacted by an airstream passing over an aircraft while in flight.

Figure 1:
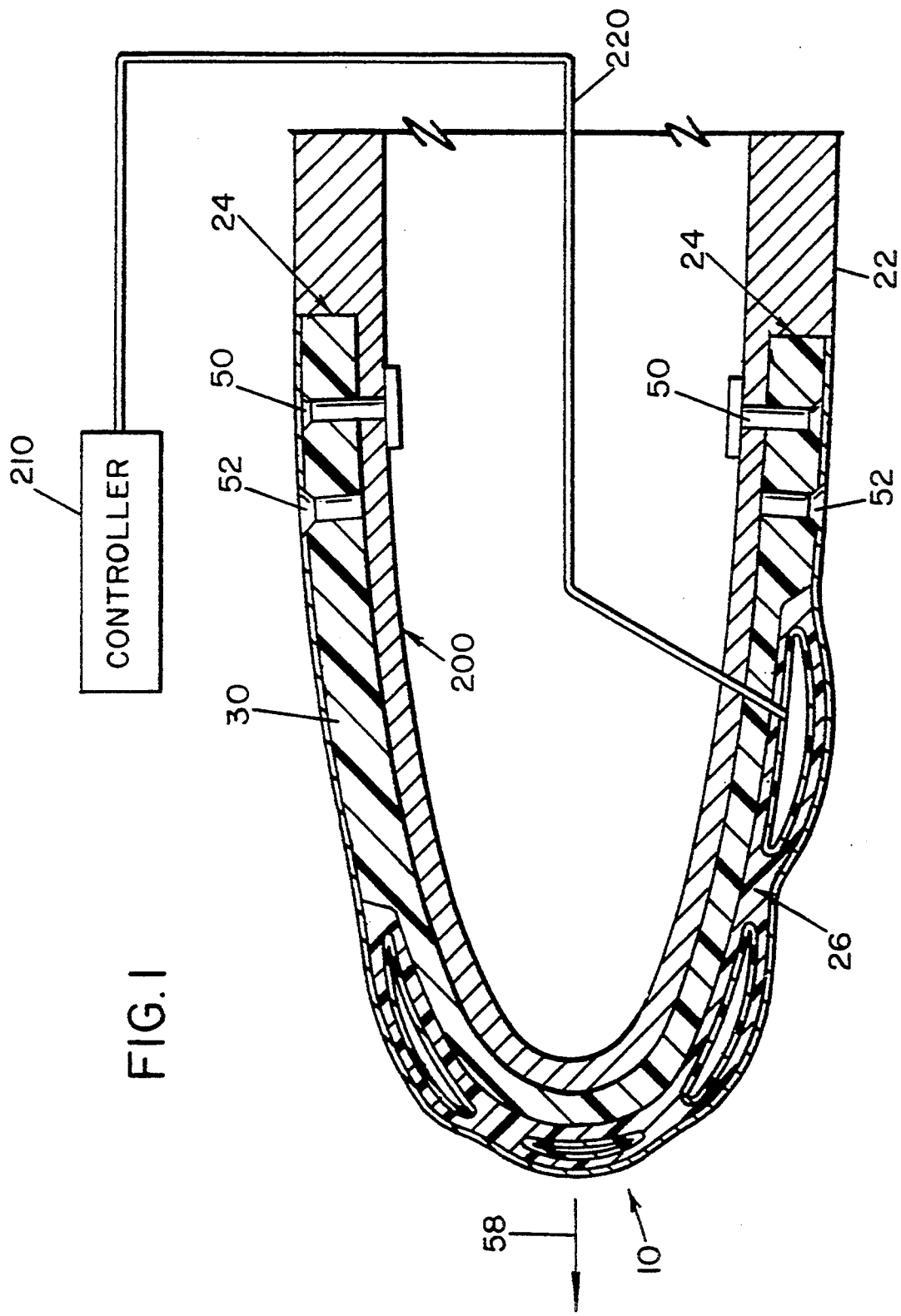
FIG. 1 is a fragmentary sectional view of an airfoil having an apparatus according to a first embodiment of the present invention defining the leading edge portion thereof, depicted in the energized state.

Referring now to FIG. 1, a modular de-icing apparatus 10 in accordance with the present invention is shown attached to an airfoil structure 200 in its energized condition with distortion exaggerated for purpose of illustration. In reality, the amount of distortion from the smooth continuous contour of the airfoil is much less. Apparatus 10 is employed in substitution for the heavy aluminum alloy skin (not illustrated) traditionally employed as the leading edge surface of an airfoil. Such aluminum alloy skins typically range in thickness from as low as about 0.025 inches to as high as 0.190 inches, the latter being for a 100-passenger or more capacity commercial airliner. Apparatus 10 includes a surface ply or outer shell 22 impermanently disposed over a deflection assembly 24. Deflection assembly 24 includes an active layer or deflection means 26 secured to a substructure or inner shell 30. Deflection means 26 preferably expulsively deflects outer shell 22. Outer shell 22 is secured to the deflection assembly 24 utilizing flush fitting mechanical fasteners 52 which prevent outer shell 22 from separating from the deflection assembly 24 and from movement in the direction of arrow 58 when the deflection means 26 is energized. Deflection assembly 24 is secured to airfoil structure 200 utilizing fasteners 50 and floating nut plates 54. It is intended that outer shell 22 be removable from the deflection assembly 24 to enable field replacement as required, for example, due to impact damage. This would be accomplished by unfastening fasteners 52. Deflection assembly 24 is secured in position to the remainder of the airfoil structure 200 in conventional manner, i.e., by flush fitting mechanical fasteners 50 as shown in FIG. 1. Such construction also enables field replacement of the deflection assembly 24 as required. Deflection assembly 24 may also be secured in position to the remainder of the airfoil structure 200 by adhesive bonding, utilizing an adhesive such as the urethane adhesive catalog number JR228 available from Bacon Industries. Deflection assembly 24 is energized by a controller 210 via a line 220. In the embodiment illustrated in FIG. 1, controller 210 would include a pressurized fluid source and line 220 would be a fluid line for conducting the pressurized fluid.

Figure 2A:
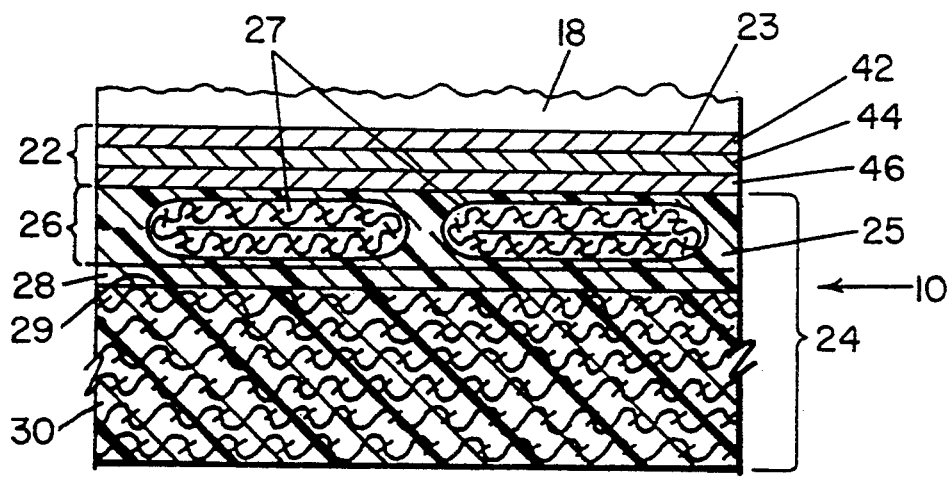
FIG. 2A is an enlarged fragmentary sectional view of an apparatus similar to that shown in FIG. 1 in its unenergized state with a layer of ice thereon.

Referring now to FIG. 2A, a preferred embodiment of apparatus 10 includes a surface ply or outer shell 22 having a modulus of elasticity of at least 40,000 Kpa. Immediately underlying the outer shell 22 is an expulsive deflection means 26. Immediately underlying the expulsive deflection means 26 is an inner bonding ply 28 of polymeric material, such as nitrile phenolic or epoxy. Underlying the inner bonding ply 28 is fiber reinforced composite inner shell 30. A layer of ice 18 is shown adhered to the outer surface 23 of outer shell 22.

Outer shell 22 preferably includes an outer layer 42, an intermediate layer 44, and a backing layer 46.

Outer layer 42 is preferably an erosion resistant material, such as Titanium foil, polyetheretherketone (PEEK) or polyurethane paint or film.

Intermediate layer 44 is preferably a high strength, highly flexible composite for providing good surface dynamics, such as a high strength fabric reinforced with a nitrile phenolic resin or adhesive, hereinafter referred to as a phenolic prepreg. A nitrile phenolic is a phenolic resin blended with nitrile rubber. Preferred fabrics for intermediate layer 44 are woven graphite such as catalog no. CGG300 available from Ciba Geigy, fiberglass such as catalog no. Style 120 available from Fiberite, or aramid fibers such as catalog no. Style 181 KEVLAR ® 49 available from Fiberite. A preferred nitrile phenolic adhesive for reinforcing the fabric is catalog no. AF32 available from 3M.

Backing layer 46 is preferably a high strength, stiffer composite (stiffer than intermediate layer 44) for providing stiffness to the shell 22 in selected areas in order to restrict deflections or excursions from the deflection means 26. The preferred material for backing layer 46 is a fabric reinforced with an epoxy adhesive or resin, hereinafter referred to as an epoxy prepreg. Preferred fabrics for backing layer 46 are the same as the fabrics utilized for intermediate layer 44, with woven graphite providing the most favorable results. The preferred material for backing layer 46 is epoxy prepreg catalog no. R6376/CGG108 available from Ciba Geigy or a phenolic prepreg utilizing graphite or glass fibers.

It may be necessary to vary the thickness of backing layer 46 as a function of the radius of curvature of the airfoil. FIG. 2A illustrates a backing layer with varying thickness. In this manner, backing layer 46 selectively stiffens outer shell 22 as a function of position. It may also be necessary to vary the thickness of backing layer 46 as a function of either or both the chordwise or spanwise position, or to eliminate backing layer 46 altogether in selective areas where increased stiffness is not desirable. Chordwise position is illustrated in FIGS. 1 and 2A in the plane of the paper and spanwise position in the plane perpendicular to the paper.

The preferred construction of outer shell 22 is defined in greater detail in U.S. Pat. No. 5,356,096, which is hereby incorporated herein by reference.

It is to be noted that the high strength fabrics utilized for the intermediate layer 44 or the backing layer 46 may be either square woven or unidirectional. If square woven fabric is utilized, the fabric should be oriented so that the weave angled with respect to the either the chord line or the span line of the airfoil, with the preferred angle of orientation being 45°.

Bonding ply 28 is formed of polymeric material suitable for bonding to the layers on either side. Such compounds are well known in the art and the selection of a particular compound will be predicated upon a number of factors which include operating environment, the nature of the materials used in the deflection means 26 and the adjacent contiguous layer 29 of the underlying composite inner shell 30. The inner bonding ply 28 in certain preferred embodiments is formed from 10 mil thick nitrile phenolic adhesive film, such as catalog number AF32 available from 3M Company. The regions 25 between adjacent tubes 27 are also formed of the same nitrile phenolic materials. An alternate material for the bonding ply 28 is a flexibilized epoxy film such as code EA951 available from Hysol Aerospace Products, Pittsburgh, Cal.

Layer 28 and the material in regions 25 are shown to be distinct to facilitate illustration and explanation of the invention. In practice distinct layers are commonly not recognizable and the material in regions 25 may have come from coating of tube materials or layer 28.

Deflection means 26 is preferably thin and typically has a thickness not exceeding 0.100 inch. Each inflatable member 27 is a tube-like structure typically running the length of the deicer, i.e., in the spanwise direction of the apparatus and airfoil. Each inflatable member 27 is formed from polymer coated textile fabric. The fabric may be coated on one side only and formed into a tubular member with the coating facing to the outside of the tube or with the coating facing to the inside of the tube provided with an adhesion barrier which is placed in the inside of the tube during manufacture to prevent adhesive joining of the fabric layers. Polytetrafluoroethylene (PTFE) film is well suited for use as an adhesive barrier in this application. Each inflatable tubular member 27 serves as a fluid impulse tube. The inflatable tubular members within the apparatus are joined by conduit means (220 in FIG. 1) to the remainder of a deicing system (210 in FIG. 1) which includes a timer/controller (not illustrated), a high pressure gas supply (not illustrated), and an impulse delivery valve (not illustrated).

A schematic of a suitable controller having a control system and high pressure valve for causing fluid impulse inflation of an inflatable tubular member in a structural member according to the invention having integral surface separation capability are described in U.S. Pat. No. 4,706,911, the contents of which are herein incorporated by reference. Preferred embodiments of gas impulse delivery valves are described in U.S. Pat. No. 4,873,647 to Robert M. Hohenshil and James C. Putt, the contents of which are herein incorporated by reference.

The fiber-reinforced polymer composite inner shell 30 is preferably formed of a plurality of layers of filamentary material in a matrix of thermoset polymeric material. Such materials and their combination into a laminated composite structure are well-known in the art. Selection of particular materials and a particular construction will be predicated upon a number of factors which may include the nature of the airfoil of which the apparatus is to form a leading edge component, bending stiffness, torsional stiffness, resistance to frontal impact, overall thickness limitation and overall weight limitation. Particularly preferred embodiments of apparatus according to the invention include a inner shell 30 formed of carbon, graphite, aramid or glass fibers reinforcing an epoxy matrix. Other high modulus, high strength fibers, such as aramid and fiberglass and the like may be employed alone or in combinations including these and other fiber types.

Figure 2B:
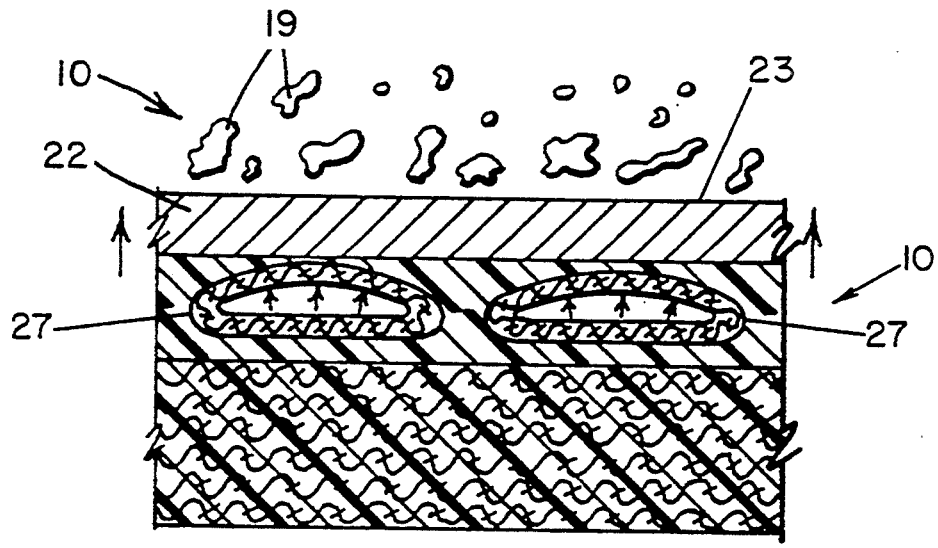
FIG. 2B is an enlarged fragmentary view of the apparatus of FIG. 2 in its energized state.

In FIG. 2B deicing apparatus 20 is shown in its energized condition with ice particles 19 being ejected. Deicing apparatus 20 depicted in FIG. 2B is of the same construction as shown and described in regard to FIG. 2A. FIG. 2A depicts deicing apparatus 20 in its at-rest or unenergized condition with a layer of ice 18 thereon. In operation, high pressure gas, typically air, is introduced in the form of a pulse into inflatable tubular members 27. Such fluid introduction produces a rapid but momentary distortion in the outer shell 22 as the pulse travels along the tube. Operation of the apparatus 20 of the present invention is generally as described in U.S. Pat. Nos. 4,706,911 and 4,747,575, and if additional inflatable tubes (not illustrated in the present application) which branch off the principal inflation tubes are provided, as described in U.S. Pat. No. 4,826,108. These gas pulses produce near instantaneous pressure changes within the inflatable tubular members 27 thereby producing a series of near instantaneous distortions to the ice accreting surface 21 overlying the deicer tube 27 which cause ice layer 18 to be broken into particles 19 and ejected. Typical supply air pressure to a rapid acting valve whose output is introduced into inflatable tubular members 27 is preferably at least about 600 psig (6894 kPa) and may be in excess of 2000 psig (13788 kPa).

While the invention has been described in detail to include pneumatic impulse deflection means, it is possible to substitute any other thin planar deflection means into the active zone which lies between the spaced layers of film adhesive. Examples of suitable thin, sheet-like electromagnetic deflection means are described in U.S. Pat. Nos. 4,690,353 to Haslim et al., 4,875,644 to Adams et al., 5,129,598 to Adams et al., and 5,142,767 to Adams et al..

Figure 3:
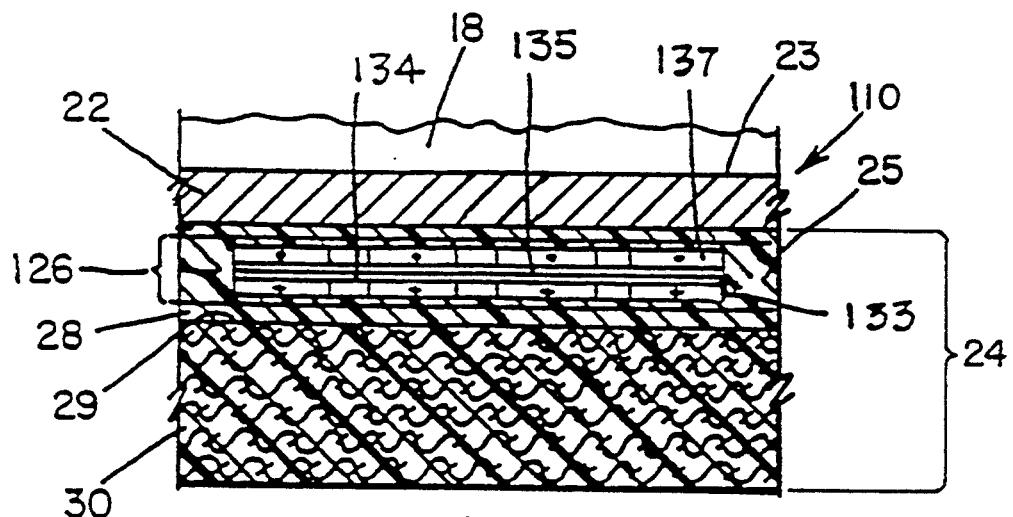
FIG. 3 is an enlarged fragmentary sectional view of an apparatus similar to that shown in FIG. 2A except that the deflection means comprises electromagnetic apparatus.

Referring now to FIG. 3, there is shown deicing apparatus 110 according to an alternate embodiment of the present invention. Apparatus 110 is of a construction similar to that described in reference to FIG. 2A except that the deflection means 24 underlying the outer shell 22 comprises a thin sheet-like electromagnetic deflection means 126. As shown in FIG. 3, the electromagnetic deflection means 126 includes a pair of sheet-like arrays, each containing in spaced apart relationship a plurality of parallel ribbon-like electrically conductive members 133, 137. The electrically conductive members 133, 137 are electrically interconnected such that any current flowing in the conductive members 133 of the first or lower sheetlike array flows in an opposite direction than current flowing in the electrically conductive members 137 of the second or upper sheet-like array. The first and second sheet-like arrays are coextensive and superposed proximate to each other such that the electrically conductive members of the first and second sheet-like members are substantially parallel. The electrically conductive members 133, 137 are electrically insulated from one another, in part by dielectric layers 134, 135. Large magnitude current pulses are fed to the conductors from a power supply (not shown) resulting in rapid and forceful separation of the first and second sheet-like arrays, thereby causing rapid movement of the outer shell 22 on which ice may accrete. In FIG. 3, a dot is used to represent current flowing out of the page and a plus sign is used to represent current flowing into the page.

Referring now to FIG. 4, the preferred attachment means 52 attaching the outer shell 22 to the deflection assembly 24 is a shear resistant fastener assembly that includes a receptacle or seat 60 which receives a pin 62 and fastener 64. Pin 62 has a chamfered cylinder 66, head portion 68 and a clearance hole 70. Seat 60 has a receptacle opening 72 for receiving chamfered cylinder 66 and a threaded hole 74 for receiving and engaging with fastener 64. It is intended that seat 60 be imbedded or disposed within airfoil deflection assembly 24 and pin 62 be imbedded or disposed within the outer shell 22. Fastener 64 is then slid through pin 62 and screwed into seat 60. Each de-icing unit of the present invention would utilize a multiplicity of such attachment means. This type of attachment means is effective in withstanding the large shear force generated at the fastener when the deflection means is energized and also functions to locate the outer shell 22.

The inlet ports provided in each of the tubes for introduction of gas pressure impulses into the inflatable members are coupled to a conduit which in turn is in fluid communication with fluid impulse generation apparatus.

Referring now to FIG. 5, wherein a modular deicing apparatus in accordance with an alternative embodiment of the present invention is generally similar to the modular de-icing apparatus illustrated hereinbefore in the previous figures and is thus indicated by reference numerals corresponding to those discussed above, except that a 300 "prefix" is utilized. The embodiment illustrated in FIG. 5 is similar to the apparatus taught by previously referenced U.S. Pat. No. 5,098,037 to Leffel et al..

A de-icing apparatus 310 includes a surface ply or outer shell 322 that is impermanently disposed over and impermanently secured to a deflection assembly 324 (which includes inner shell 330 and deflection means 326) utilizing flush fitting mechanical fasteners 352 which prevent outer shell 322 from separating from the deflection assembly 324 from moving in the direction of arrow 358 when the deflection assembly 324 is energized. It is intended that outer shell 322 be removable from the deflection assembly 324 and to enable field replacement as required, for example, due to impact damage. This would be accomplished by unfastening fasteners 352. Deflection assembly 324 is secured in position to the remainder of the airfoil structure 300 in conventional manner, i.e., by flush fitting mechanical fasteners 350, 354. Such construction also enables field replacement of the deflection assembly 324 as required. Deflection assembly 324 may also be secured in position to the remainder of the airfoil structure 300 by adhesive bonding. It is to be noted that in the embodiment illustrated in FIG. 5, the fasteners 352 that hold the outer shell are positioned forward (with respect to the leading edge of the airfoil) of the fasteners 350, 354 that hold the deflection assembly 324.

Referring now to FIG. 6, wherein a modular de-icing apparatus in accordance with an alternative embodiment of the present invention is generally similar to the modular de-icing apparatus illustrated hereinbefore in the previous figures and is thus indicated by reference numerals corresponding to those discussed above, except that a 400 "prefix" is utilized.

A de-icing apparatus 410 includes a surface ply or outer shell 422 that is impermanently disposed over a deflection assembly 424 and impermanently secured to the deflection assembly 424 and airfoil structure 400 utilizing flush fitting mechanical fasteners/nut plates 452. Fasteners 452 and engagement lip 460 of outer shell 422 and deflection assembly 424 prevent outer shell 422 from movement in the direction of arrow 458 when deflection assembly 424 is energized. Outer shell 422 and deflection assembly 424 are thus "keyed" to provide positive locking. This positive locking feature helps to ensure a tight fitting de-icing apparatus and also reduces the number of fasteners which are necessary. It is intended that outer shell 422 be removable from the deflection assembly 424 to enable field replacement as required, for example, due to impact damage. This would be accomplished by unfastening fasteners 452. Fasteners 452 also secure outer shell 422 and deflection assembly 424 to the remainder of the airfoil structure 400.

Figure 7:
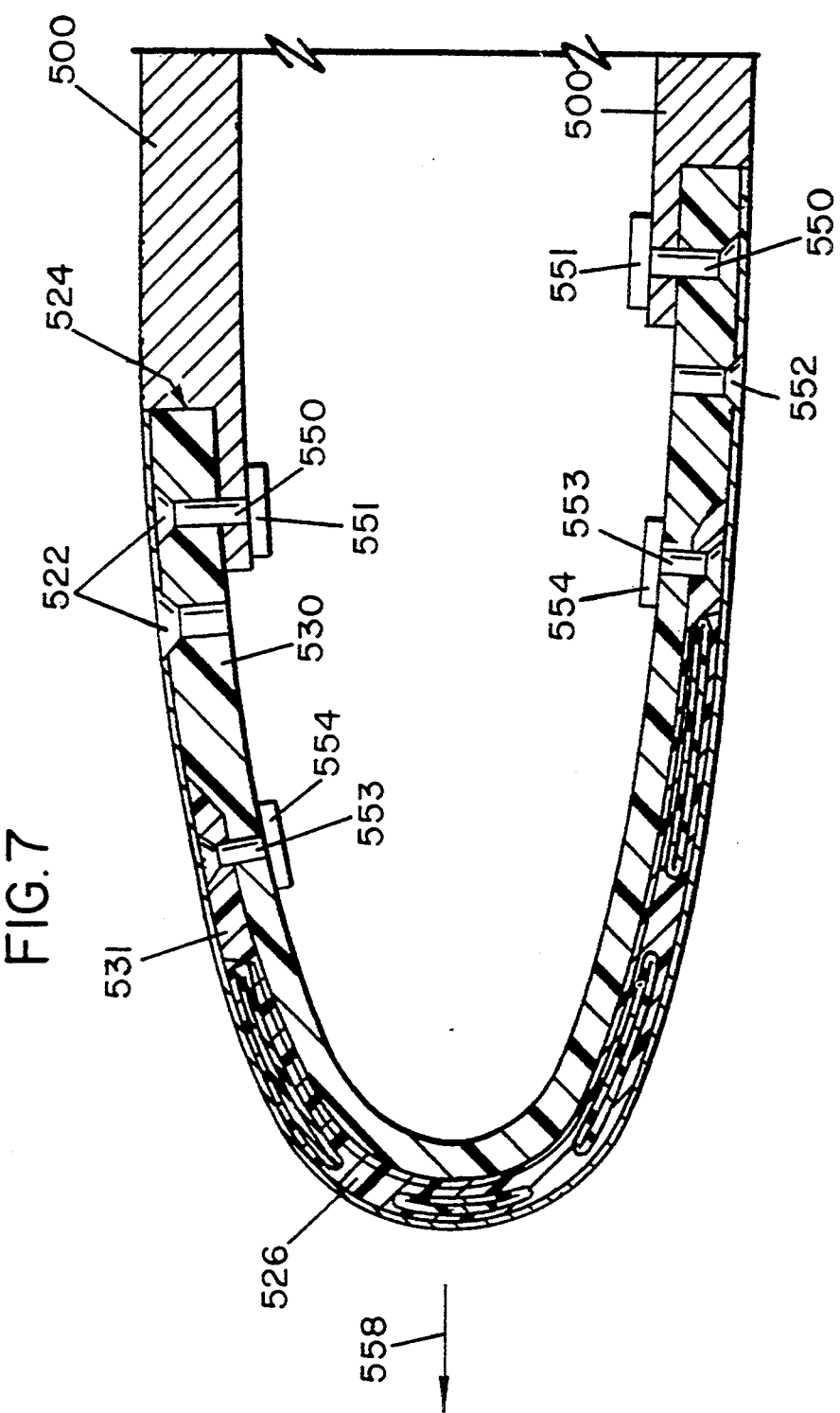
FIG. 7 is a fragmentary sectional view of an airfoil having an apparatus according to a fourth alternative embodiment of the present invention defining the leading edge portion thereof, depicted in the non-energized state.

Referring now to FIG. 7, wherein a modular deicing apparatus in accordance with an alternative embodiment of the present invention is generally similar to the modular de-icing apparatus illustrated hereinbefore in the previous figures and is thus indicated by reference numerals corresponding to those discussed above, except that a 500 "prefix" is utilized and the deflection means is illustrated in the de-energized state.

A de-icing apparatus 510 includes a surface ply or outer shell 522 that is impermanently disposed over and secured to a deflection assembly 524 utilizing fasteners 552. Deflection assembly 524 is impermanently secured to the airfoil structure 500 utilizing fasteners 550 and nut plates 551. Fasteners 552 prevent outer shell 522 from movement in the direction of arrow 558 when deflection assembly 524 is energized. Deflection assembly 524 includes an active layer or deflection means 526 integrally formed with a deflection means backing hull 531. The preferred material for hull 531 is graphite prepreg catalog no. CGG108/7769 available from Ciba Geigy or a phenolic prepreg utilizing graphite or glass fibers. Hull 531 is impermanently secured to a substructure or inner shell 530 utilizing fasteners 553 and nut plates 554.

Figure 8:
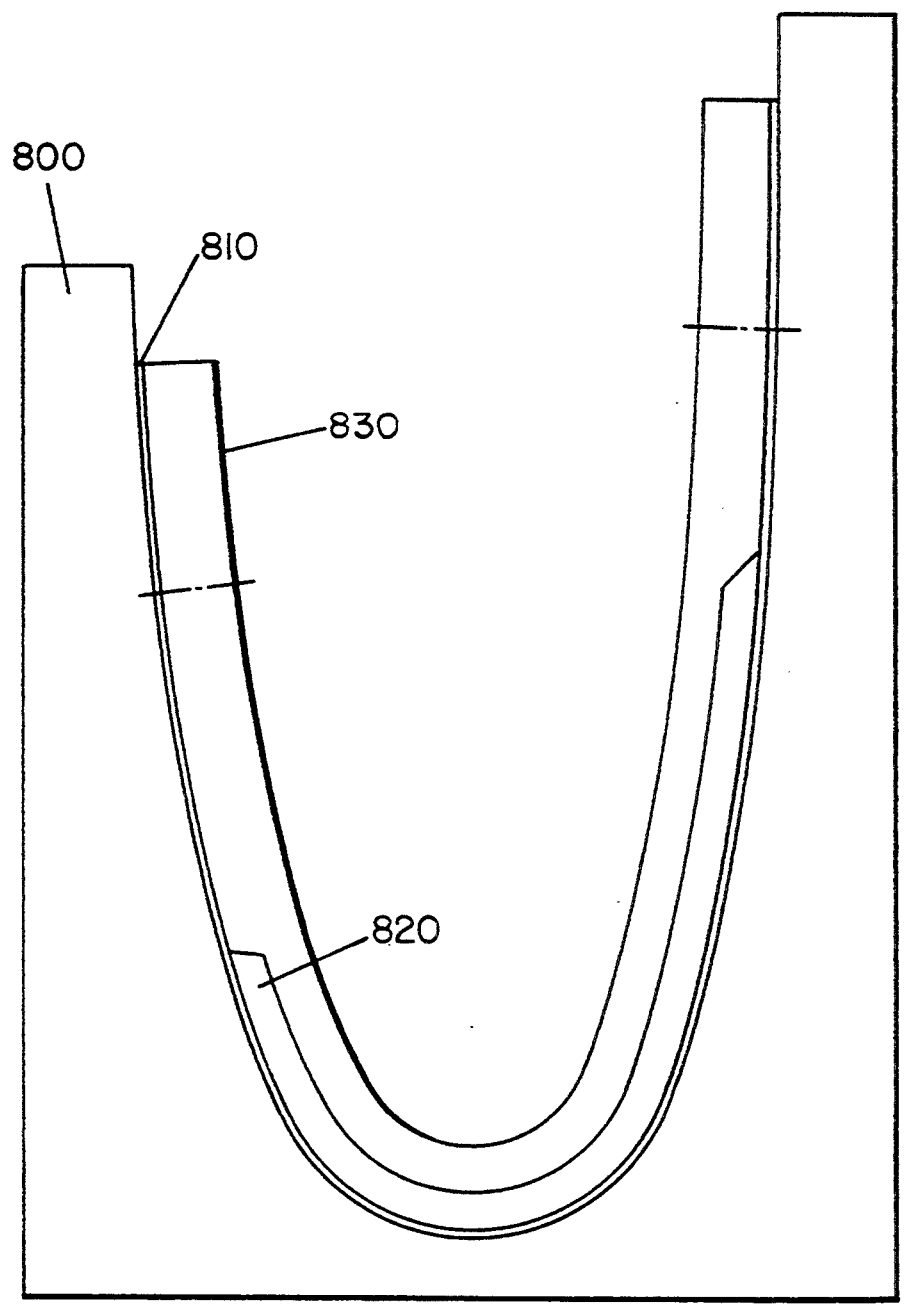
FIG. 8 is a cross-sectional view of tooling for manufacturing an apparatus according to the present invention.

Referring now to FIG. 8, the preferred tools for manufacturing de-icer 510 of FIG. 7 includes female tools 800, 810, and male tools 820, and 830. Tool 800 is utilized to form shell 522. Deflection means 526 and hull 531 are assembled on male tool 530 and inserted female tool 810, the assembly is then inserted in female tool 800 for curing. Inner shell 530 is constructed after inserting female 810 and male tool 820 into female tool 800, laying up, and curing the prepreg materials.

The material for deflection means 526 is preferably a phenolic prepreg. The deflection means 526 is preferably made in accordance with the method disclosed in U.S. Pat. No. 5,098,037 to Leffel et al. referenced hereinbefore. In particular, the description starting with column 13, line 65 of that patent and continuing to column 15, line 2.

The hull 531 is preferably manufactured by forming four to eight layers of CGG108/7769 to the appropriate dimensions. The uncured hull prepreg should extend at least 2 inches beyond the deflection means 526° The hull 531 should then be cured at 350° F. for 60 min. at 50 psi autoclave pressure.

Although the invention has been described with reference to certain and preferred embodiments, including the best embodiments, it would be apparent to people skilled in the art of deicing of aircraft that other variations are possible which are obvious thereover. These variations are intended to be included by the present specification and appended claims. For instance, different adhesive materials may be employed. The outer shell may be treated to further enhance its hardness or to provide a reduced coefficient of ice adhesion. The outer shell may be provided with a backing layer of fiber reinforced resin to enhance resistance to impact, e.g., hail or bird strikes. A combination of gas pressure impulse and electrically energized force and displacement generating means may be employed in a single part. The composite deflection assembly need not be of uniform thickness or construction throughout the entire contour surface but rather may be locally made of differing dimensions and properties according to the requirements of the intended application. Specifically, the composite deflection assembly may be reinforced adjacent to its point of mechanical joinder to remainder of the airfoil structure. The inflatable tubular members may be arranged to extend in a spanwise direction of airfoil as depicted in FIG. 1 or in the chordwise direction (not illustrated) or in a combination of direction to provide enhanced performance. The best manner of tube arrangement for a particular application is empirically determinable by one skilled in the art.

We claim:

1. A de-icing apparatus for an airfoil comprising:
   deflection means;
   a separable outer shell impermanently disposed over said deflection means, said separable outer shell having a modulus of elasticity of at least 40,000 kPA; and,
   wherein said deflection means causes distortion of said separable outer shell.

2. A de-icing apparatus for an airfoil in accordance with claim 1, further comprising shell attachment means for impermanently attaching said separable outer shell to the airfoil.

3. A de-icing apparatus for an airfoil in accordance with claim 2, wherein said shell attachment means comprises a fastener.

4. A de-icing apparatus for an airfoil in accordance with claim 2, wherein said shell attachment means comprises:

pin means having a through hole therein, said pin means being disposed in said separable outer shell and protruding therefrom;

receptacle means having a seat means for receiving said pin means and a threaded hole in axial alignment with said seat means, said receptacle means being disposed in the airfoil; and, fastener means for extending through said through hole and engaging with said threaded hole.

5. A de-icing apparatus for an airfoil in accordance with claim 2, wherein said shell attachment means comprises:

pin means having a through hole therein, said pin means being disposed in said separable outer shell and protruding therefrom;

receptacle means having a seat means for receiving said pin means and a threaded hole in axial alignment with said seat means, said receptacle means being disposed in said deflection means; and, fastener means for extending through said through hole and engaging with said threaded hole.

6. A de-icing apparatus for an airfoil in accordance with claim 1, further comprising shell attachment means for impermanently attaching said separable outer shell to said deflection means.

7. A de-icing apparatus for an airfoil in accordance with claim 1, further comprising deflection attachment means for impermanently attaching said deflection means to the airfoil.

8. A de-icing apparatus for an airfoil in accordance with claim 1, wherein said deflection means comprises at least one inflatable member.

9. A de-icing apparatus for an airfoil in accordance with claim 1, wherein said deflection means comprises electromagnetic apparatus.

10. A de-icing apparatus for an airfoil in accordance with claim 1, further comprising controller means for controlling said deflection means.

11. A de-icing apparatus for an airfoil in accordance with claim 1, wherein said separable outer shell comprises a metal.

12. A de-icing apparatus for an airfoil in accordance with claim 1, wherein said separable outer shell comprises a plastic.

13. A de-icing apparatus for an airfoil in accordance with claim 1, wherein said separable outer shell comprises a primary layer of fabric reinforced by a nitrile phenolic resin.

14. A de-icing apparatus for an airfoil in accordance with claim 1, wherein said separable outer shell comprises:

a primary layer comprised of a first fabric reinforced by a nitrile phenolic resin;

a backing layer comprised of a second fabric reinforced by an epoxy resin.

15. A de-icing apparatus for an airfoil in accordance with claim 1, wherein said deflection means comprises an active layer having a deflection generator and a composite substructure.

16. A de-icing apparatus for an airfoil in accordance with claim 15, wherein said active layer is bonded to said substructure by a layer selected from the group consisting of nitrile phenolic and epoxy.

17. A de-icing apparatus for an airfoil in accordance with claim 1, wherein said deflection means comprises an active layer having a deflection generator, a first composite substructure bonded to said active layer, and a second composite substructure impermanently attached to said first composite substructure.

18. A de-icing apparatus for an airfoil in accordance with claim 17, further comprising first impermanent attachment means for attaching said first composite substructure to said second composite substructure, and second impermanent attachment means for attaching said second composite substructure to the airfoil.

19. A de-icing apparatus for an airfoil in accordance with claim 1, wherein said separable outer shell comprises an outer layer and a backing layer.

20. A de-icing apparatus for an airfoil in accordance with claim 1, wherein said separable outer shell comprises a first engagement lip and said deflection means comprises a second engagement lip, and said first engagement lip and said second engagement lip engage with one another to resist shearing movement of said separable outer shell relative to said deflection means.

21. A structural member having integral surface deicing capability comprising from bottom to top:

a composite substructure;

deflection means impermanently attached to said composite substructure; and, a separable outer shell impermanently disposed over said deflection means, said separable outer shell having a modulus of elasticity of at least 40,000 kPA.

22. A structural member in accordance with claim 21, further comprising shell attachment means for impermanently attaching said separable outer shell over said deflection means.

23. A structural member in accordance with claim 22, wherein said shell attachment means comprises a fastener.

24. A structural member in accordance with claim 22, wherein said shell attachment means comprises:

pin means having a through hole therein, said pin means being disposed in said separable outer shell and protruding therefrom;

receptacle means having a seat means for receiving said pin means and a threaded hole in axial alignment with said seat means, said receptacle means being disposed in said substructure; and, fastener means for extending through said through hole and engaging with said threaded hole.

25. A structural member in accordance with claim 21, further comprising controller means for controlling said deflection means.

26. A structural member in accordance with claim 21, wherein said separable outer shell comprises a metal.

27. A structural member in accordance with claim 21, wherein said separable outer shell comprises a plastic.

28. A structural member in accordance with claim 21, wherein said separable outer shell comprises a primary layer of fabric reinforced by a nitrile phenolic resin.

29. A de-icing apparatus for an airfoil in accordance with claim 21, wherein said separable outer shell comprises:

a primary layer comprised of a first fabric reinforced by a nitrile phenolic resin;

a backing layer comprised of a second fabric reinforced by an epoxy resin.

30. A de-icing apparatus for an airfoil in accordance with claim 21, wherein said separable outer shell comprises an outer layer and a backing layer.

31. A method for de-icing an airfoil comprising the steps of:

impermanently attaching a deflection means to the airfoil utilizing first attachment means;

impermanently covering said deflection means with a separable outer shell having a modulus of elasticity of at least 40,000 kPA utilizing shell attachment means; and, energizing said deflection means to thereby cause distortion of said separable outer shell.

32. A de-icing apparatus for an airfoil in accordance with claim 31, wherein said first attachment means is comprised of fasteners.

33. A de-icing apparatus for an airfoil in accordance with claim 31, wherein said shell attachment is comprised of a shear resistant fastener.

34. A de-icing apparatus for an airfoil comprising:

deflection means comprising an active layer having a deflection generator and a composite substructure having a first engagement surface; and, a separable outer shell impermanently disposed over said deflection means comprising an outer layer and a composite backing layer having a second engagement surface for engaging with said first engagement surface, said separable outer shell having a modulus of elasticity of at least 40,000 kPA, wherein said deflection means causes distortion of said separable outer shell, and said first and second engagement surfaces engage with one another to resist shearing movement of said separable outer shell relative to said deflection means.

35. A de-icing apparatus for an airfoil comprising:

deflection means comprises an active layer having a deflection generator, a first composite substructure bonded to said active layer, and a second composite substructure impermanently attached to said first composite substructure, said second composite substructure having a first engagement surface; and, a separable outer shell impermanently disposed over said deflection means comprising an outer layer and a composite backing layer having a second engagement surface for engaging with said first engagement surface, said separable outer shell having a modulus of elasticity of at least 40,000 kPA, wherein said deflection means causes distortion of said separable outer shell, and said first and second engagement surfaces engage with one another to resist shearing movement of said separable outer shell relative to said deflection means.

* * * * *